United States Patent
He et al.

(10) Patent No.: US 11,256,695 B1
(45) Date of Patent: Feb. 22, 2022

(54) HYBRID QUERY EXECUTION ENGINE USING TRANSACTION AND ANALYTICAL ENGINES

(71) Applicant: Amazon Technologies, Inc., Seattle, WA (US)

(72) Inventors: Yingjie He, Cupertino, CA (US); Gopi Krishna Attaluri, Cupertino, CA (US); Kamal Kant Gupta, Snoqualmie, WA (US); Saileshwar Krishnamurthy, Sunnyvale, CA (US); Yongsik Yoon, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 684 days.

(21) Appl. No.: 15/922,490

(22) Filed: Mar. 15, 2018

Related U.S. Application Data

(60) Provisional application No. 62/590,221, filed on Nov. 22, 2017.

(51) Int. Cl.
| | |
|---|---|
| *G06F 16/20* | (2019.01) |
| *G06F 16/2453* | (2019.01) |
| *G06F 16/28* | (2019.01) |
| *G06F 16/25* | (2019.01) |
| *G06F 16/22* | (2019.01) |

(52) U.S. Cl.
CPC .... *G06F 16/24542* (2019.01); *G06F 16/2282* (2019.01); *G06F 16/252* (2019.01); *G06F 16/28* (2019.01)

(58) Field of Classification Search
None
See application file for complete search history.

(56) References Cited

U.S. PATENT DOCUMENTS

| | | | | |
|---|---|---|---|---|
| 7,136,749 | B2 * | 11/2006 | Ichihara | G01C 21/343 701/533 |
| 7,289,999 | B2 * | 10/2007 | Ellis | G06F 16/2462 |
| 8,229,923 | B2 * | 7/2012 | Mirchandani | G06F 16/283 707/718 |
| 9,053,210 | B2 | 6/2015 | Elnikety et al. | |
| 9,501,550 | B2 | 11/2016 | Zhang et al. | |
| 2003/0212668 | A1 * | 11/2003 | Hinshaw | G06F 16/2471 |
| 2011/0161310 | A1 * | 6/2011 | Tang | G06F 16/24542 707/714 |
| 2018/0046643 | A1 * | 2/2018 | Brodt | G06F 16/2457 |

* cited by examiner

*Primary Examiner* — Belix M Ortiz Ditren
(74) *Attorney, Agent, or Firm* — Robert C. Kowert; Kowert, Hood, Munyon, Rankin & Goetzel, P.C.

(57) ABSTRACT

A hybrid query engine using different query engines may be implemented to provide access to a database. A database query to a database may be received at a hybrid query engine. A plan to perform the database query may be generated that when performed by the hybrid query engine causes one query engine to perform an assigned portion of the plan by accessing data that describes the database. Another portion of the plan assigned to another query engine may be performed by the hybrid query engine to cause the other query engine to perform the other portion of the plan by accessing the same data that describes the database.

20 Claims, 10 Drawing Sheets

US 11,256,695 B1

HYBRID QUERY EXECUTION ENGINE USING TRANSACTION AND ANALYTICAL ENGINES

RELATED APPLICATIONS

This application claims benefit of priority to U.S. Provisional Application Ser. No. 62/590,221, entitled "HYBRID QUERY EXECUTION ENGINE USING TRANSACTION AND ANALYTICAL ENGINES," filed Nov. 22, 2017, and which is incorporated herein by reference in its entirety.

BACKGROUND

Online transaction processing (OLTP) and online analytical processing (OLAP) present different requirements for database architectures. In conventional systems, customers with high throughput requirement may maintain separate database systems to address these requirements. While allowing for improved overall throughput for the combined workloads, this separation has many disadvantages including the burden of keeping data synchronized between the separate systems.

Typical OLTP database systems, such as order entry or bank transaction processing, produce workloads where data is accessed and processed in small portions of the dataset and, therefore, can be executed quickly. These systems evolved over time to integrate longer running online analytical processing (OLAP) queries that process substantial portions of the data. Initial attempts to execute these queries on the OLTP databases resulted in resource contentions and poor throughput of the OLTP portions of the workload. Therefore, an architecture dividing the two workloads emerged. Separate databases for the workloads were established with the OLAP database asynchronously updated with OLTP data. Unfortunately, the cost of maintaining two databases, particularly when high data availability is needed, combined with the OLAP data remaining stale in between updates, which could be significant periods of time depending on application needs, results in a suboptimal solution.

Figure 1:
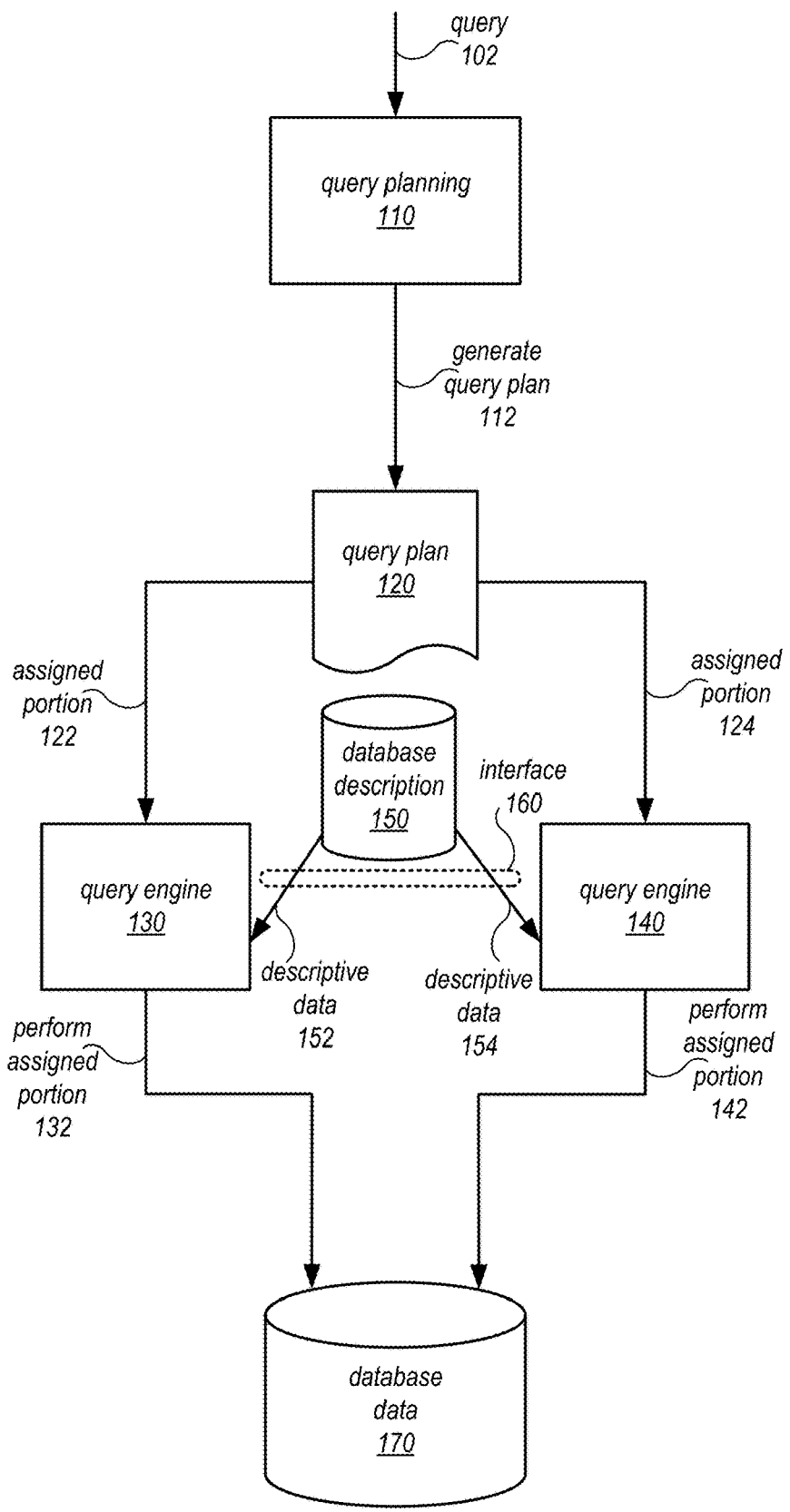
FIG. 1 is logical block diagram for implementing a hybrid query engine using different engines, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of a hybrid query engine are described herein. Different query engines may support similar or divergent sets of features in order to process queries to a database, in some embodiments. For example, some query engines provide databases that support applications or clients that initiate multiple transactions, in some embodiments. Online transaction processing (OLTP) query engines (e.g., MySQL) may be optimized to efficiently and safely process many transactions while maintaining atomicity, concurrency, and isolation, in some embodiments. Other types of query engines, such as online analytical processing (OLAP) query engines (e.g., Apache Impala) may offer more performant solutions for complex or long-running queries that access large amounts of data, in some embodiments. A hybrid query engine may make use of the strengths offered by different query engines implemented as part of the hybrid query engine, in various embodiments, in order to improve the performance of database queries on a computing system or device that implements the hybrid query engine.

FIG. 1 is logical block diagram for implementing a hybrid query engine using different engines, according to some embodiments. Database queries directed to a database may be received at a hybrid query engine, in some embodiments. Query planning 110 may take, for example, a received query 102, and perform various initial processing operations. For example, the query may be parsed into a tree structure that can be then be evaluated to identify or determine possible operations and orderings of operations to accomplish the query 102. For example, as discussed below with regard to FIG. 9, query planning 110 may use a planning model that estimates or forecasts the costs of various operations in possible query plans to generate a most cost effective plan. In some embodiments, query planning 110 may account for the operations (and performance characteristics thereof) supported by different query engines included in a hybrid query engine, such as query engine 130 and query engine 140.

As illustrated in FIG. 1, query planning 110 may generate 112 query plan 120. Assigned portions, or all, of query plan 120 may be provided to query engines 130 and 140 respectively, as indicated at 122 and 124. The assigned portions may include instructions or other information describing what operations to perform (e.g., joins, scans, filters, aggregations, etc.) and when to perform the operations (e.g., operation orders, input data, such as results from another query engine or from another operation at the same query engine), in some embodiments. In order to perform the assigned portions of the query plan database description information 150 may be accessed via a common interface 160, as indicated at 152 and 154, in order to perform various operations. For example, expression evaluation data or functions that can evaluate an expression supported by another query engine (e.g., recognizing various operators, key words, or other expression syntax or semantics) may be accessed in order to provide an evaluated expression or database schema information for tables or statistics of data within the database could be accessed or evaluated in order to inform the performance of assigned operations, in some embodiments. Query engines 130 and 140 may then, in some embodiments, access database data 170 in order to perform the assigned portions of the plan, as indicated at 132 and 142. For example, scan operations may be performed to retrieve data. Not illustrated in FIG. 1 may be the exchange of data between query engines 130 and 140 (e.g., sharing operation results to use as input to an operation at another query engine), in some embodiments.

Please note, FIG. 1 is provided as a logical illustration of query engines in a hybrid query engine, query planning, query plans, descriptive data for a database, and database data and respective interactions and is not intended to be limiting as to the physical arrangement, size, or number of components, modules, or devices to implement such features.

The specification first describes an example network-based database service that includes the disclosed hybrid query engine. Included in the description of the example network-based database service are various aspects of the example network-based database service, such as a database engine head node, and a separate storage service. The specification then describes flowcharts of various embodiments of methods for implementing a hybrid query engine. Next, the specification describes an example system that may implement the disclosed techniques. Various examples are provided throughout the specification.

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the aforementioned layers), and then adding glue logic to stitch them together. In some embodiments, the systems described herein may instead offload the functionality of the durability and space management layer from the database tier to a separate storage layer, and may distribute that functionality across multiple storage nodes in the storage layer.

In some embodiments, the database systems described herein may retain much of the structure of the upper half of the database instance discussed in the example above, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a read-write node server, which may also be referred to herein as a read-write node server, that receives read and/or write requests from various client programs (e.g., applications) and/or subscribers (users), then parses them and develops an execution plan to carry out the associated database operation(s). For example, the read-write node may develop the series of steps necessary to obtain results for complex queries and joins. In some embodiments, the read-write node may manage communications between the database tier of the database system and clients/subscribers, as well as communications between the database tier and a separate distributed storage system.

In some embodiments, the read-write node may be responsible for receiving SQL requests from end clients through a JDBC or ODBC interface and for performing SQL processing and transaction management (which may include locking) locally. However, rather than generating data pages locally, the read-write node (or various components thereof) may generate redo log records and may ship them to the appropriate nodes of a separate distributed storage system. In some embodiments, a client-side driver for the distributed storage system may be hosted on the read-write node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the read-write node). For example, in embodiments in which data is made durable through the use of protection groups, the read-write node may not be able to commit a transaction until and unless the client-side driver receives a reply from enough storage node instances to constitute a write quorum.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments.

In some embodiments, the client-side driver(s) running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver(s) (may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may determine the one or more nodes that are implementing the storage for the targeted data page (e.g., based on storage metadata for the distributed storage system), and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

Figure 2:
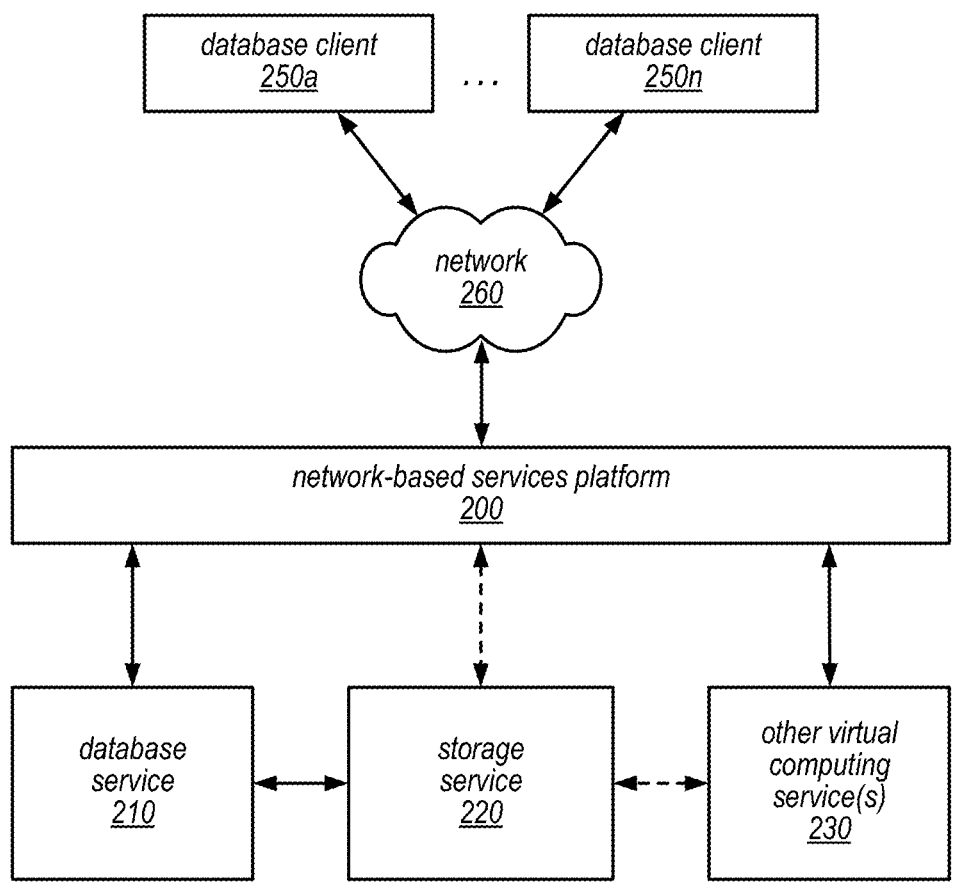
FIG. 2 is a block diagram illustrating a service system architecture for a network-based database service that implements hybrid query engine using transactional and analytic engines, according to some embodiments.

One embodiment of a service system architecture that may implement a web services-based database service is illustrated in FIG. 2. In the illustrated embodiment, a number of clients (shown as database clients 250a-250n) may interact with a network-based services platform 200 via a network 260. Network-based services platform 200 may interface with one or more instances of a database service 210, a storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a database service client) may provide access to network-based storage of database tables to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to network-based services platform 200 may be coordinated by client 250 and the operating system or file system on behalf of applications executing within the operating system environment.

Clients 250 may convey network-based services requests to and receive responses from network-based services platform 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may implement one or more service endpoints may receive and process network-based services requests, such as requests to access data pages (or records thereof). For example, network-based services platform 200 may include hardware and/or software may implement a particular endpoint, such that an HTTP-based network-based services request directed to that endpoint is properly received and processed. In one embodiment, network-based services platform 200 may be implemented as a server system may receive network-based services requests from clients 250 and to forward them to components of a system that implements database service 210, storage service 220 and/or another virtual computing service 230 for processing. In other embodiments, network-based services platform 200 may be configured as a number of distinct systems (e.g., in a cluster topology) implementing load balancing and other request management features may dynamically manage large-scale network-based services request processing loads. In various embodiments, network-based services platform 200 may support REST-style or document-based (e.g., SOAP-based) types of network-based services requests.

In addition to functioning as an addressable endpoint for clients' network-based services requests, in some embodiments, network-based services platform 200 may implement various client management features. For example, network-based service platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Network-based services platform 200 may also implement financial accounting and billing systems, or may maintain a database of usage data that may be queried and processed by external systems for reporting and billing of client usage activity. In certain embodiments, network-based services platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, network-based services platform 200 may also implement user authentication and access control procedures. For example, for a given network-based services request to access a particular database table, network-based services platform 200 may ascertain whether the client 250 associated with the request is authorized to access the particular database table. Network-based services platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass network-based services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of storage service 220 in storing database tables on behalf of clients 250 may be transparent to those clients. In other embodiments, storage service 220 may be exposed to clients 250 through network-based services platform 200 to provide storage of database tables or other information for applications other than those that rely on database service 210 for database management. This is illustrated in FIG. 2 by the dashed line between web services platform 200 and storage service 220. In such embodiments, clients of the storage service 220 may access storage service 220 via network 260 (e.g., over the Internet). In some embodiments, a virtual computing service 230 may receive storage services from storage service 220 (e.g., through an API directly between the virtual computing service 230 and storage service 220) to store objects used in performing computing services 230 on behalf of a client 250. This is illustrated in FIG. 2 by the dashed line between virtual computing service 230 and storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
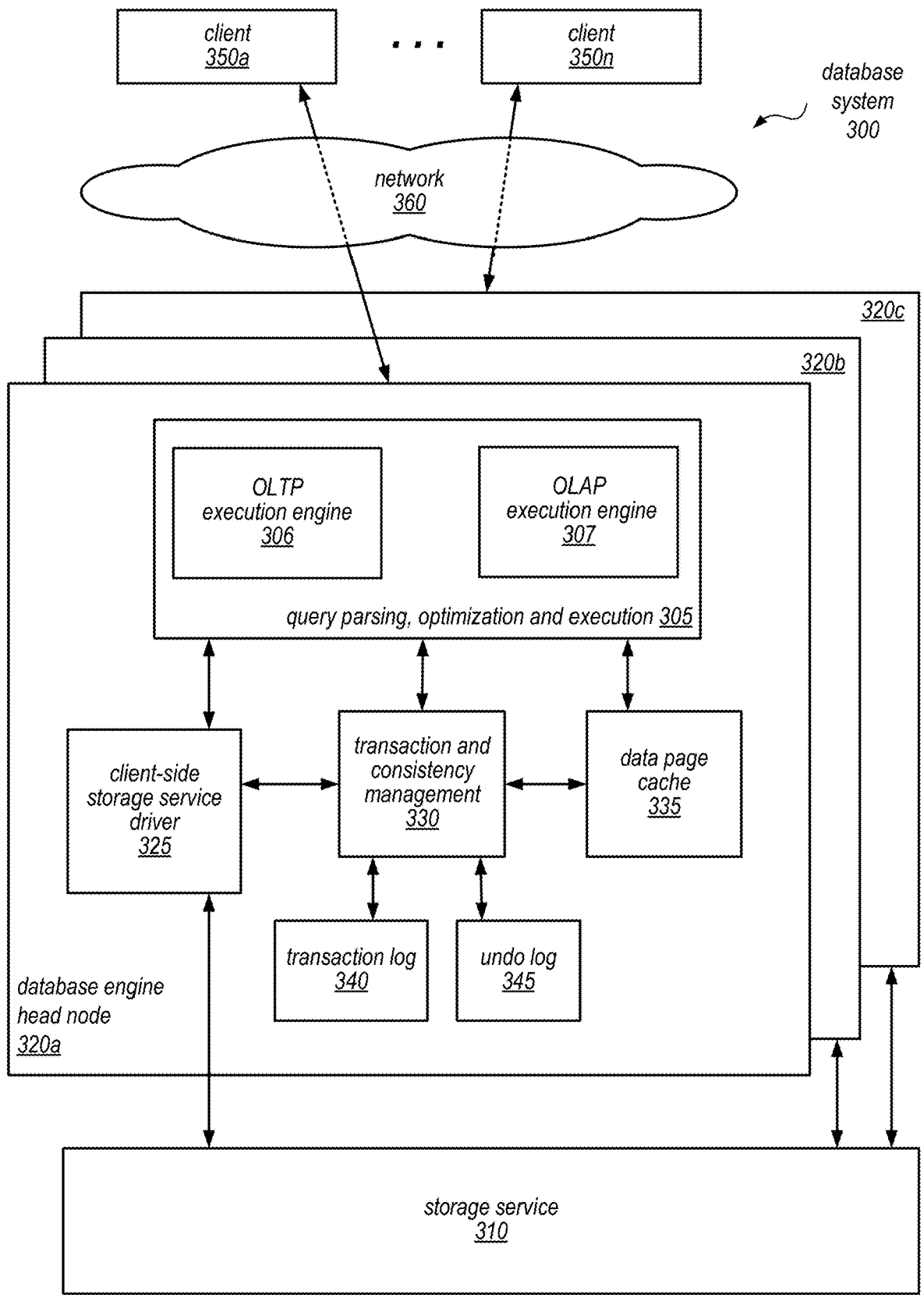
FIG. 3 is a block diagram illustrating various components of a database system that implement a hybrid query engine using transactional and analytic engines, according to some embodiments.

FIG. 3 is a block diagram illustrating various components of a database system that implement a hybrid query engine using transactional and analytic engines, according to some embodiments. In this example, database system 300 includes respective database engine heads node 320*a*, 320*b*, and 320*c* for each of several database tables and a storage service 310 (which may or may not be visible to the clients of the database system, shown as clients 350*a*-350*n*). As illustrated in this example, one or more of clients 350*a*-350*n* may access a database engine head node 320 (e.g., database engine head node 320*a*, database engine head node 320*b*, or database engine head node 320*c*, each of which is a component of a respective database instance) via network 360 (e.g., these components may be network-addressable and accessible to the clients 350*a*-350*n*). Storage service 310, which may be employed by the database system to store data pages of one or more database tables (and redo log records and/or other metadata associated therewith) on behalf of clients 350*a*-350*n*, and to perform other functions of the database system as described herein, may or may not be network-addressable and accessible to the clients 350*a*-350*n*, in different embodiments. For example, in some embodiments, storage service 310 may perform various storage, access, change logging, recovery, and/or space management operations in a manner that is invisible to clients 350*a*-350*n*.

A database instance may include a database engine head node 320 that receives requests from various client programs (e.g., applications) and/or subscribers (users), then parses them, optimizes them, and develops an execution plan to carry out the associated database operation(s) using a hybrid query engine, in some embodiments. In the example illustrated in FIG. 3, a query parsing, optimization, and execution component 305 of database engine head 320*a* may perform these functions for queries that are received from client 350*a* and that target the database instance of which database engine head node 320*a* is a component. In some embodiments, the query parsing, optimization, and execution component 305 may return query responses to client 350*a*, which may include write acknowledgements, requested data pages (or portions thereof), error messages, and or other responses, as appropriate. Query parsing, optimization, and execution 305 may implement a hybrid query engine and as such may implement both OLTP execution 306 and OLAP execution engine 307 which may process database queries according to the various techniques discussed below with regard to FIGS. 6-9, in some embodiments. As illustrated in this example, database engine head node 320*a* may also include a client-side storage service driver 325, which may route read requests and/or change notifications (e.g., redo log records) to a read-only node and/or various storage nodes within storage service 310, receive write acknowledgements from storage service 310, receive requested data pages from distributed storage service 310, and/or return data pages, error messages, or other responses to the query parsing, optimization, and execution component 305 (which may, in turn, return them to client 350*a*). In some embodiments, client-side storage driver 325 may have access to storage metadata. Storage metadata may provide an access scheme for obtaining or writing to distributed storage service 310 (e.g., mapping information to one or more components within storage service 310 storing data for database system 300). When routing read or write requests to storage service 310, client-side storage driver 348 may access storage metadata to determine the particular storage nodes to send read or write requests to.

In this example, database engine head node 320*a* includes data page cache 335, in which data pages that were recently accessed (read and/or write) may be temporarily held. As illustrated in FIG. 3, read-write node 320*a* may also include transaction and consistency management component 330, which may be responsible for providing transactionality and consistency in the database instance of which read-write node 320*a* is a component. For example, this component may be responsible for ensuring the Atomicity, Consistency, and Isolation properties of the database instance and the transactions that are directed that the database instance. As illustrated in FIG. 3, database engine head node 320*a* may also include transaction log 340 and undo log 345, which may be employed by transaction and consistency management component 330 to track the status of various transactions and roll back any locally cached results of transactions that do not commit. Database engine head node 320*a* may also maintain one or more in-memory data structures, such as a data dictionary, active transactions information, or any other information for describing the data structure or schema of the database which may be accessed by both OLTP execution engine 306 and OLAP execution engine 307. Other components, such as the query parsing, optimization, and execution 305, transaction and consistency management 330, and client-side storage service driver 325, may access storage metadata in order to process queries, generate change notification messages, and/or any other system functions.

In various embodiments, when planning to perform a received database query, query parsing, optimization, and execution may generate a plan that includes operations performed by different execution engines, such as OLTP execution engine 306 and OLAP execution engine 307. For example, a plan may include a hash join or aggregation operation to be performed by OLAP execution engine 307 while other operations such as filters or scans may for the query may be performed by OLTP execution engine 306, in some embodiments. In such scenarios, the respective execution engines may perform the assigned portion of the plan for the database query. In some embodiments, in order to process the request, common data describing the database and/or supported OLTP or OLAP features may be used by either OLTP 306 or OLAP 307 execution engines. OLAP execution engine 307, for instance, may retrieve information to evaluate an expression supported by OLTP execution engine 306 and execute the assigned operation. In some embodiments, OLAP execution engine 307 may return results to OLTP execution engine 206 to be included and/or forwarded to client 350a, which may include write acknowledgements, requested data pages (or portions thereof), error messages, and or other responses, as appropriate. OLTP execution engine 306 and OLAP execution engine 307 may reside in the same process, thereby eliminating inter-process communication delays and enabling OLTP execution engine 306 and OLAP execution engine 307 to operate together without unnecessary data copying, in some embodiments.

Note that each of the other database engine head nodes 320 illustrated in FIG. 3 (e.g., 320b and 320c) may include similar components and may perform similar functions for queries received by one or more of clients 350a-350n and directed to the respective database instances of which it is a component.

In some embodiments, a storage device may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An storage device is not necessarily mapped directly to hardware. For example, a single storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
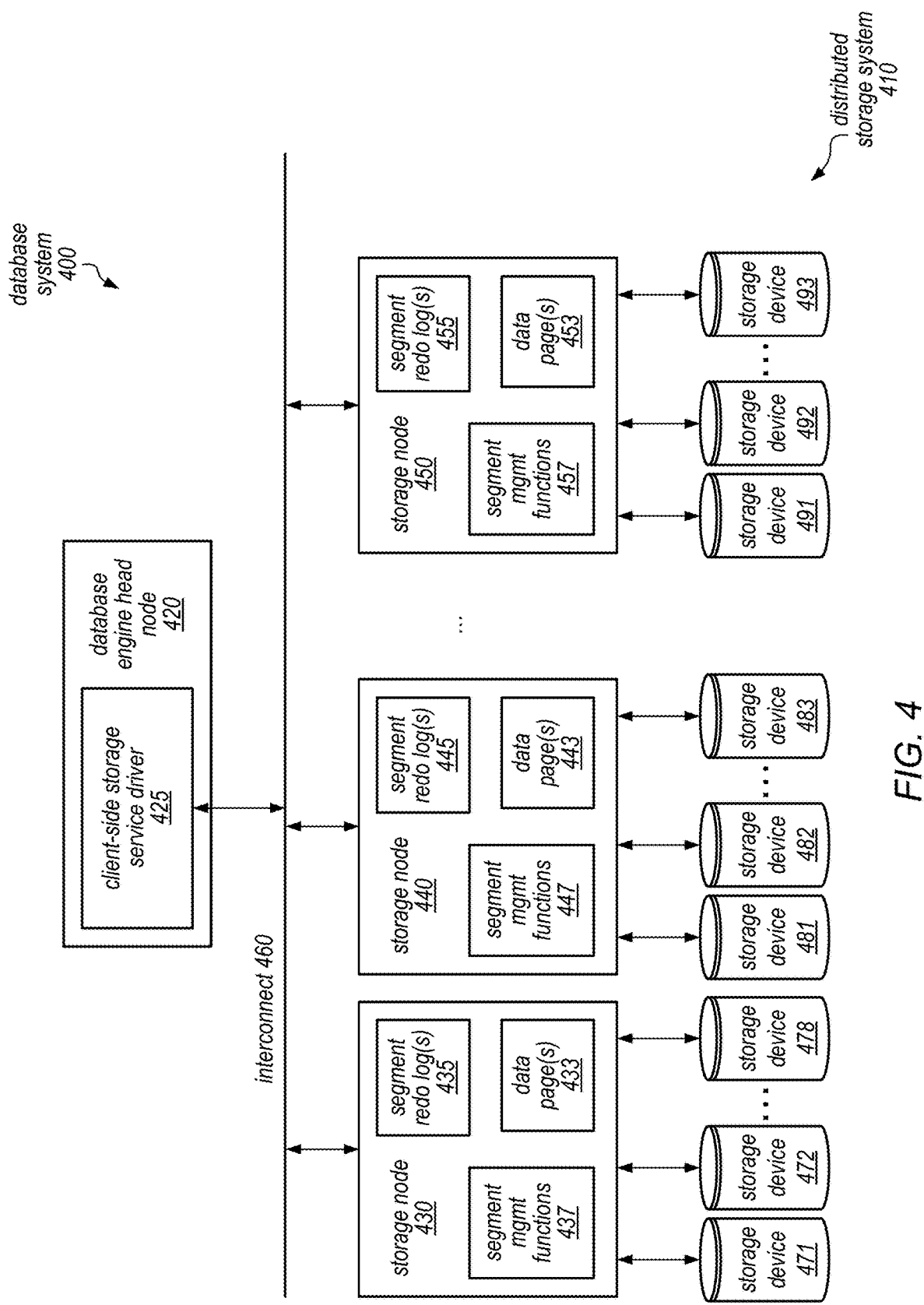
FIG. 4 is a block diagram illustrating a distributed storage system for a database system, according to some embodiments.

One embodiment of a distributed storage system that may implement a storage service is illustrated by the block diagram in FIG. 4. In this example, a database system 400 includes a distributed storage system 410, which communicates with a database engine head node 420 over interconnect 460. As in the example illustrated in FIG. 3, database engine head node 420 may include a client-side storage service driver 425. In this example, distributed storage system 410 includes multiple storage nodes (including those shown as 430, 440, and 450), each of which includes storage for data pages, redo logs for the segment(s) it stores, system metadata for database engine head 420 (e.g., data dictionary data, transaction table data etc.) and hardware and/or software may perform various segment management functions. For example, each storage node may include hardware and/or software may perform at least a portion of any or all of the following operations: replication (locally, e.g., within the storage node), coalescing of redo logs to generate data pages, crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments.

In the example illustrated in FIG. 4, storage node 430 includes data page(s) 433, segment redo log(s) 435, segment management functions 437, and attached storage devices 471-478. Similarly, storage node 440 includes data page(s) 443, segment redo log(s) 445, segment management functions 447, and attached storage devices 481-488; and storage node 450 includes data page(s) 453, segment redo log(s) 455, segment management functions 457, and attached storage devices 491-498.

Figure 5:
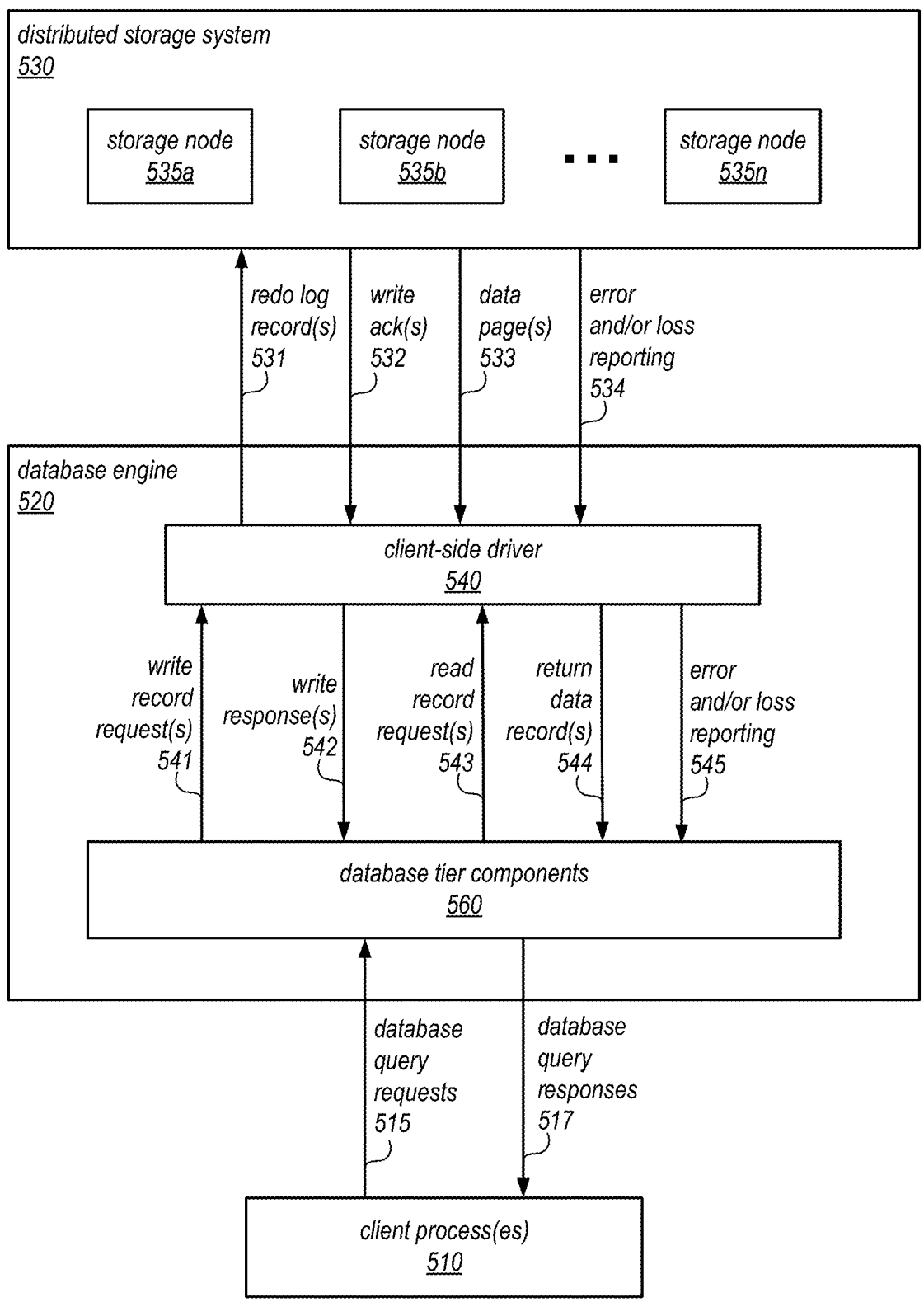
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

Figure 6:
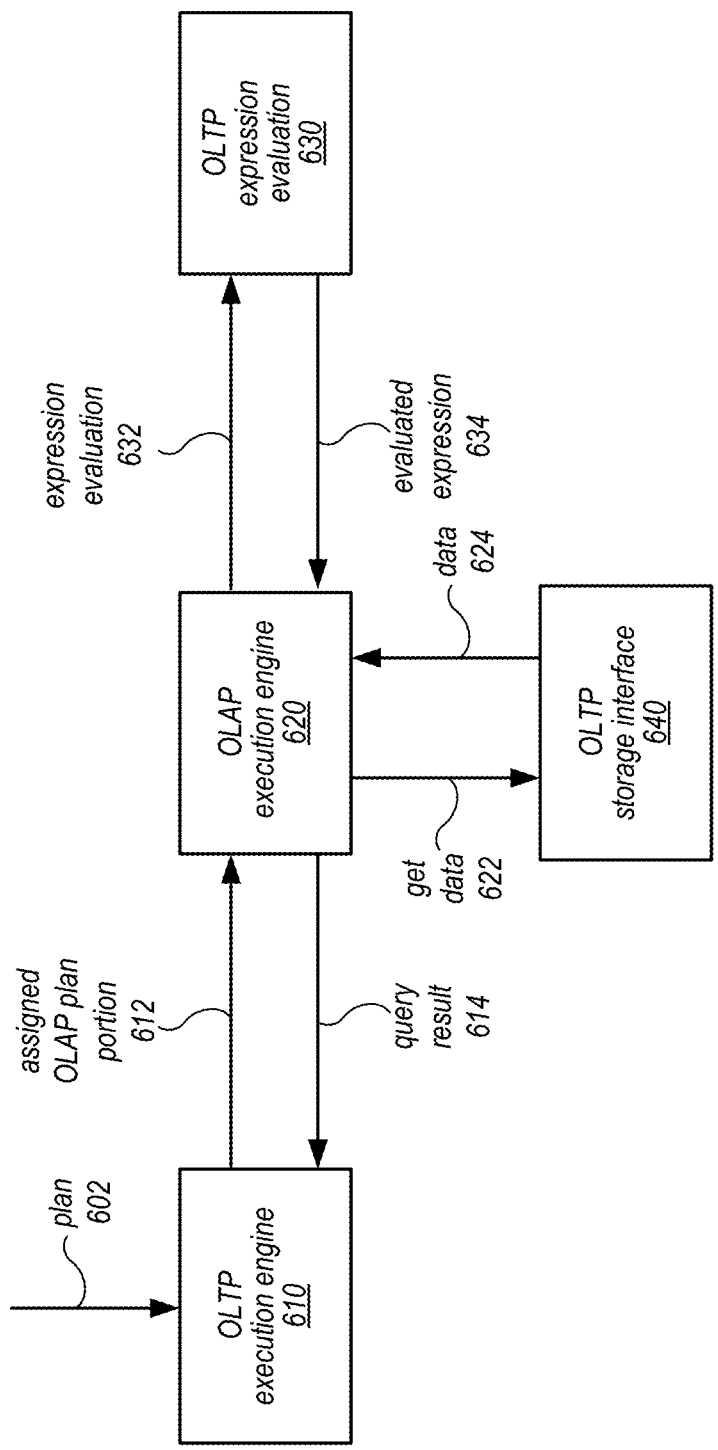
FIG. 6 is a logical block diagram illustrating interactions between OLTP and OLAP execution engines implemented as part of a hybrid query engine, according to some embodiments.

FIG. 6 is a logical block diagram illustrating interactions between OLTP and OLAP execution engines implemented as part of a hybrid query engine, according to some embodiments. As discussed above with regard to FIG. 3, a database engine head node may include multiple query engines that work together as a single hybrid query engine in order to process database queries. As illustrated in FIG. 6, the OLTP and OLAP executions may interact in order to process a database query. For example, a plan 602 generated to perform a database query (as discussed below with regard to FIG. 9) may be provided to OLTP execution engine 610. OLTP execution engine may be able to perform various operations and upon reaching, identifying, or recognizing operations to be performed by OLAP execution engine 620, OLTP execution engine 610 may provide the assigned OLAP portion of the plan 612 to OLAP execution engine 620.

OLAP execution engine 620 may utilize various common data and interfaces of OLTP execution engine 610 in order to perform the assigned portion 612. For example, OLAP execution engine may access expression evaluation 632 data or function that can evaluate an OLTP expression 630 (e.g., recognizing various operators, key words, or other expression syntax or semantics) in order to provide an evaluated expression 634 which OLAP execution engine 620 can use to continue performing assigned operations. Although not illustrated, similar interactions for other information, such as database schema information for tables or statistics of data within the database could be accessed or evaluated in order to inform the performance of assigned operations, in some embodiments.

OLTP execution engine 620 may utilize OLTP storage interface 640 in order to get 622 and receive data 624 for processing, in some embodiments. For example, OLTP storage interface 640 may interact with a client-side storage driver or page cache as discussed above with regard to FIGS. 3-5 in order to retrieve the requested data 622, in some embodiments. As operations are completed, results of the query determined by operations at OLAP execution engine 620 may be provided 614 back to OLTP execution engine 610 (which may ultimately provide the result of a database query to a client, in some embodiments).

Figure 7A:
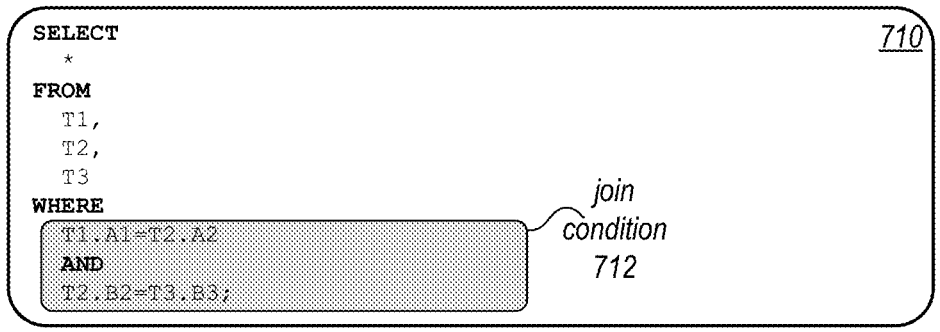
FIG. 7A is an example query that can be performed by a hybrid query engine, according to some embodiments.

Different queries may trigger the performance of different operations in a hybrid query engine, like the hybrid query engine discussed above with regard to FIGS. 3 and 6. FIG. 7A is an example query that can be performed by a hybrid query engine, according to some embodiments. Query 710 may be query to retrieve data, a "SELECT" query. All data ("*") may be returned from tables "T1" "T2" and "T3" that satisfy a join condition 712. Because different joins may be supported by different query engines (e.g., OLTP joins may be different than OLAP joins), query 710 may result in a query plan that utilizes both query engines.

Figure 7B:
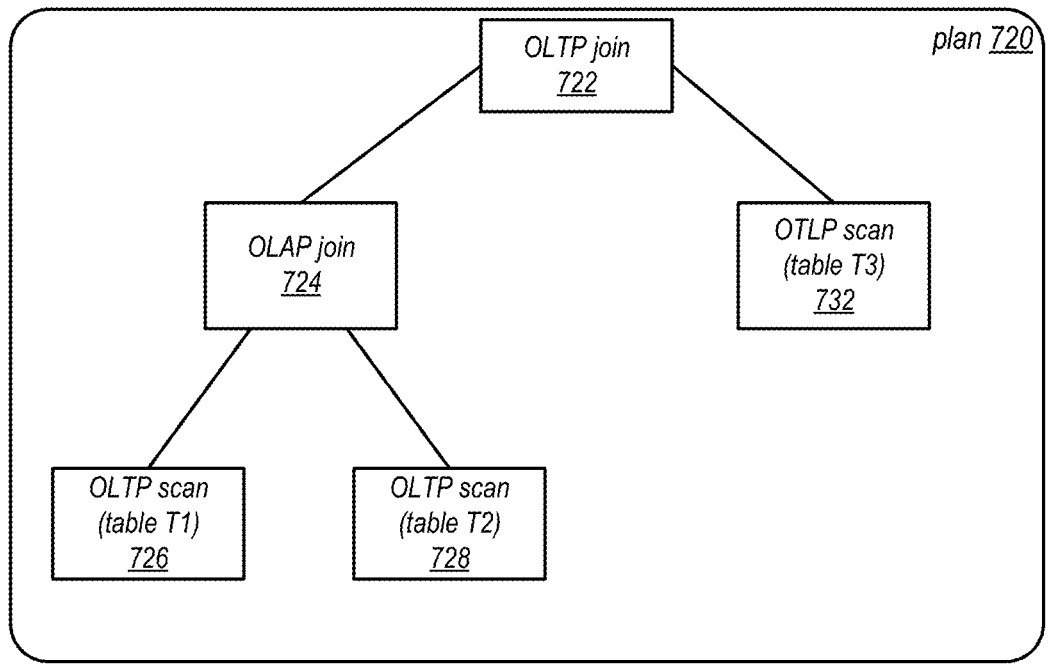
FIG. 7B is an example plan generated for a database query to be performed at a hybrid query engine, according to some embodiments.

FIG. 7B is an example plan generated for a database query to be performed at a hybrid query engine, according to some embodiments. Plan 720 may include OLTP scan operations 726, 728, and 732 to retrieve data from storage (e.g., performed by the OLTP execution engine). The operation names, nodes, or other indicators may identify which execution or query engine is to perform an operation, in some embodiments. Instead of utilizing an OLTP join for tables T1 and T2, OLAP join 724 is included in plan 720. The OLAP join operation may be provided to an OLAP execution or query engine in order to perform the join based on the data scanned from tables T1 and T2. The resulting joined data may be provided to an OLTP execution or query engine in order to perform an OLTP join 722, to join the OLAP join results with a scan of table T3.

Figure 8:
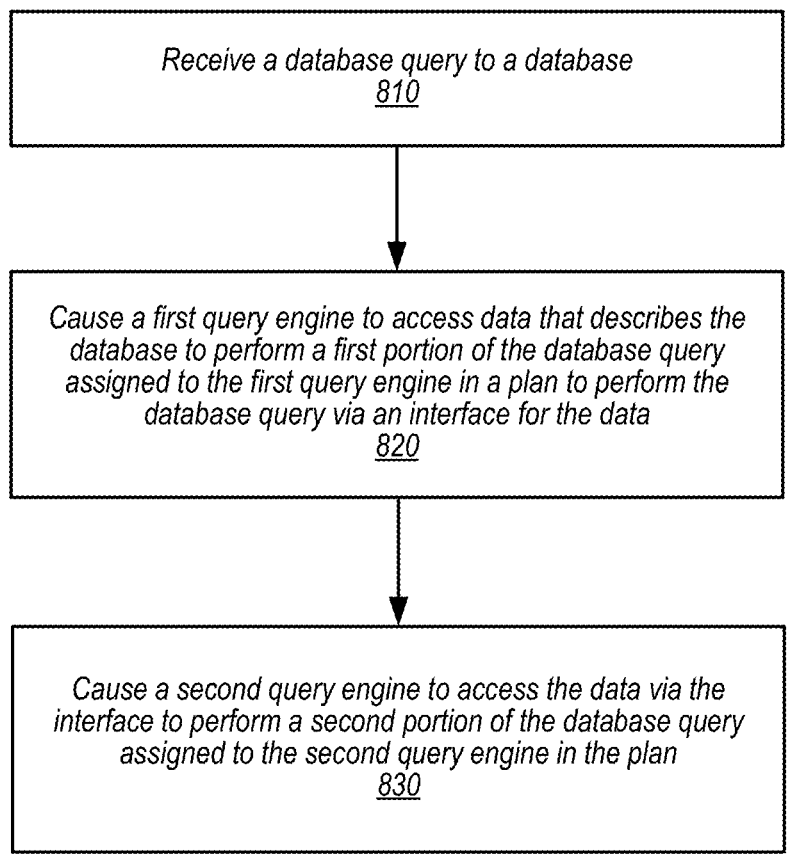
FIG. 8 is a high-level flowchart illustrating various methods and techniques for implementing a hybrid query engine using different query engines, according to some embodiments.

The database service and storage service discussed in FIGS. 2 through 7B provide examples of a system that may implement a hybrid query engine. However, various other types of database systems may implement a hybrid query engine. For example, a database system that utilizes storage locally attached to a node may implement a hybrid query engine. FIG. 8 is a high-level flowchart illustrating various methods and techniques for implementing a hybrid query engine using different query engines, according to some embodiments. Various different systems and devices may implement the various methods and techniques described below, either singly or working together. For example, a database engine head node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 810, a database query to a database may be received. For example, the database query maybe received at either the first or second query engine, which may be hosted on a same server, node, or other computing device, such as a database engine head node discussed above with regard to FIG. 3. In some embodiments, the first and second query engines (or other query processing system) may be co-located at a node that utilizes locally attached storage to store the database, while in other embodiments the database may be stored separately from the first and second query engines (e.g., in a separate data store as discussed above with regard to FIGS. 2-7. The database may be stored as a plurality of partitions across the different storage nodes, in some embodiments, or stored in a single location or partition in other embodiments. The database query may be specified according to a query language (e.g., SQL), programmatic interface (e.g., API), or other protocol or format, in some embodiments. The query may include one or more predicates, features, or other criteria that identify what data is to be accessed and how that data is to be accessed (e.g., a SELECT statement to retrieve data, or an UPDATE, INSERT, or DELETE statement to modify the database), in some embodiments.

In response to receiving the database query, a first query engine may be caused to access data that describes the database to perform a first portion of the database query assigned to the first query engine in a plan to perform the database query via an interface for the data, as indicated at 820, in some embodiments. For example, a hybrid query engine, as discussed above may include a query parsing, planning, and optimization feature which may identify the steps to perform in order to respond to a database query. As discussed below with regard to FIG. 9, various planning models may be used to generate the plan to perform the query in order to determine, for example, a least costly plan, in some embodiments. The plan, as discussed above with regard to FIG. 7 may specify, identify, or otherwise assign operations to different query engines of a hybrid query engine. For example, an OLTP query engine may be assigned operations that include scans, filters, joins, predicate evaluations, among others. The assignments may be identified by the type of operations included in the plan (which only one of the query engines may be capable of performing) or there may be an identifier or explicit mapping between an operation and a query engine (e.g., in the event that both query engines are capable of performing the same operation), in some embodiments.

The first query engine may be provided with plan, in some embodiments, in order for the first query engine to identify and perform the operations for which it is responsible. Depending on the operation, the first query engine may access different portions of the data that describes the database to perform the first portion of the query. For example, as discussed above with regard to FIGS. 1 and 6, the descriptive data shared between query engines may include information that describes expressions supported by one (or both) query engines. In this way, the first (or second) query engine can access the expression description information in order to properly interpret the operation to be performed (e.g., different comparison operators, arithmetic operators, logical operators, or other features of expressions that are evaluated with respect to performing a database query may be described in the data). In another example, the descriptive data may describe the schema of the table(s) being accessed by the query (e.g., number of columns, data types of columns, whether columns can store null or default values, etc.). Access to the data may allow the query engines to correctly identify which columns and how to evaluate data within the columns of database tables when performing an assigned operation, in some embodiments. Other tuple data (e.g., statistics or distribution information) about tables in a database may be similar accessed in order to perform various other operations to perform a database query, in some embodiments.

The interface to access the data may be a common invocation (e.g., an API or other abstract interface) which may allow for different types of query engines to access the data. In some embodiments, different portions of the data (e.g., expression data, schema data, table statistics, etc.) may be accessed via different common interfaces.

As indicated at 830, a second query engine may be caused to access the data via the interface to perform a second portion of the database query assigned to the second query engine in the plan, in some embodiments. Similar to the techniques discussed above with regard to element 820, the second query engine may access and use the commonly shared data via the same interface (or interfaces) in order to perform one or more operations assigned in the query plan. In some embodiments, the first query engine may invoke or otherwise trigger performance of the second query engine, as discussed above with regard to FIG. 6 and below with regard to FIG. 9, while in other embodiments, the second query engine may receive some (e.g., the assigned portions) or all of the plan and proceed independently from the first query engine.

Figure 9:
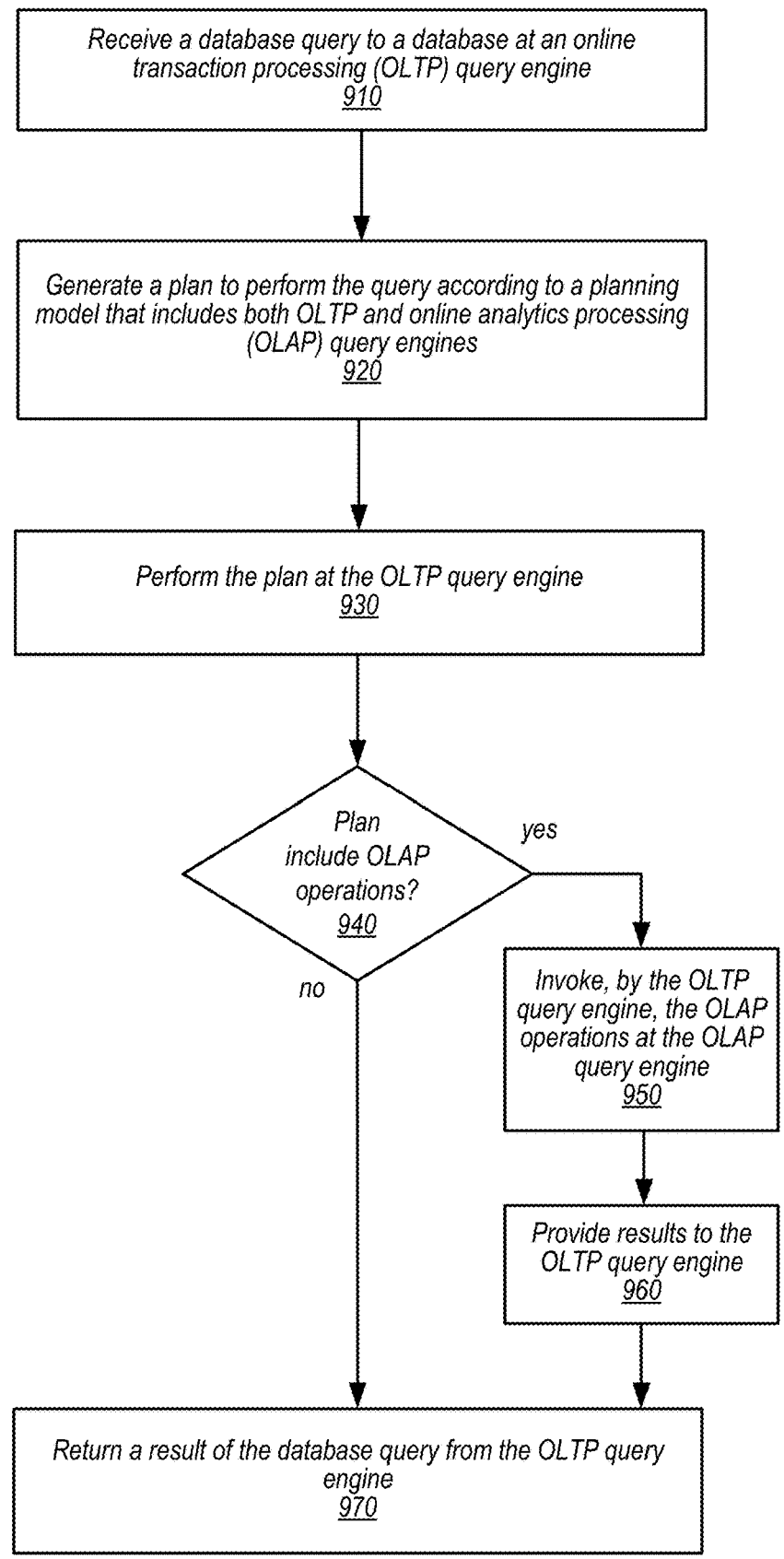
FIG. 9 is a high-level flowchart illustrating various methods and techniques for performing a database query at hybrid query engine, according to some embodiments.

Some hybrid query engines may include different types of query engines that support different styles of database queries. FIG. 9 is a high-level flowchart illustrating various methods and techniques for performing a database query at hybrid query engine that implements both OLTP and OLAP query engines, according to some embodiments. As indicated at 910, a database query to the database may be received at an online transaction processing (OLTP) query engine, in some embodiments. As discussed above with regard to FIG. 8, the database query may be specified according to a query language (e.g., SQL), programmatic interface (e.g., API), or other protocol or format, in some embodiments. The query may include one or more predicates, features, or other criteria that identify what data is to be accessed and how that data is to be accessed (e.g., a SELECT statement to retrieve data, or an UPDATE, INSERT, or DELETE statement to modify the database), in some embodiments. The database query may include features, expressions, operators, flags, indicators or other information supported by OLTP query engine in some embodiments, which the OLAP engine could interpret or support by accessing information that describes the supported features in order to interpret or otherwise perform operations consistent with the supported features of the OLTP query engine.

As indicated at 920, a plan to perform the query may be generated according to a planning model that includes both OLTP and online analytical processing (OLAP) query engines, in some embodiments. For example, the planning model may include cost estimates for performing various different operations by the OLTP and OLAP query engines. Multiple possible query plans may be generated, including different operations. In some embodiments the different possible query plans may include different operations supported by different query engines (e.g., OLAP-specific operations and OLTP-specific operations) or operations that may be performed by either the OLTP or OLAP query engines. In this way cost estimates (which may also be based on the size of tables or a predicted number of tuples to be operated upon by an operation) can be generated to evaluate the differences between different operations performed by different query engines (e.g., the cost effectiveness of an inner loop join performed by the OLTP engine vs the cost effectiveness of a hash join performed by the OLAP engine), or the differences between the same operation performed by different query engines (e.g., the cost effectiveness of OLTP expression evaluation and filtering vs OLAP expression evaluation and filtering).

As discussed above with regard to FIG. 7B, the query plan may assign or otherwise indicate which operations may be performed by which query engine. As indicated at 930, the plan may be provided to and performed at the OLTP engine, in some embodiments. For example, the various operations assigned to the OLTP engine may be performed according to the ordering or other information described by the plan. Not all database queries received at a hybrid query engine may utilize both query engines of a hybrid query engine. In some scenarios, query planning may generate a plan that is most cost effective if entirely by one query engine. For example, FIG. 9 illustrates that some queries may be performed only by the OLTP engine, while other database queries may be performed by both the OTLP and OLAP query engines, in some embodiments. Although not illustrated, in some scenarios the OLAP query engine could perform a database query without the OLTP query engine. Thus the previous examples are not intended to be limiting.

As indicated by the positive exit from 940, for those plans that include OLAP operations, the OLTP engine may invoke the OLAP operations at the OLAP engine, in some embodiments. For example, function calls, procedures, or APIs may be used to trigger performance of operations at an OLAP engine by the OLTP engine. The relevant portions (or the entirety of) the plan may be provided to the OLAP query engine, in some embodiments. As discussed above with regard to FIG. 8, the OLAP query engine could access shared data to perform the invoked OLAP operations (e.g., evaluating expressions using the expression descriptions, evaluating table data using table schemas, evaluating table statistics, etc.). The OLAP query engine may provide operation results to the OLTP query engine, as indicated at 960, in some embodiments. In some scenarios, the OLTP and OLAP query engines may be executed or performed by the same process and thus providing results may not involve copying or communication, in some embodiments.

As indicated at 970, a result of the database query may be returned from the OLTP query engine, in some embodiments. For example, the results may returned to a same client or user via the same interface, channel, protocol, or communication link via which the database query was received. In some embodiments, the results of the query may be provided to a different location and/or in a different format. If OLAP operations are performed the results of the OLAP operations may be combined or utilized according to the plan, as discussed above in the example described in FIG. 7B.

Figure 10:
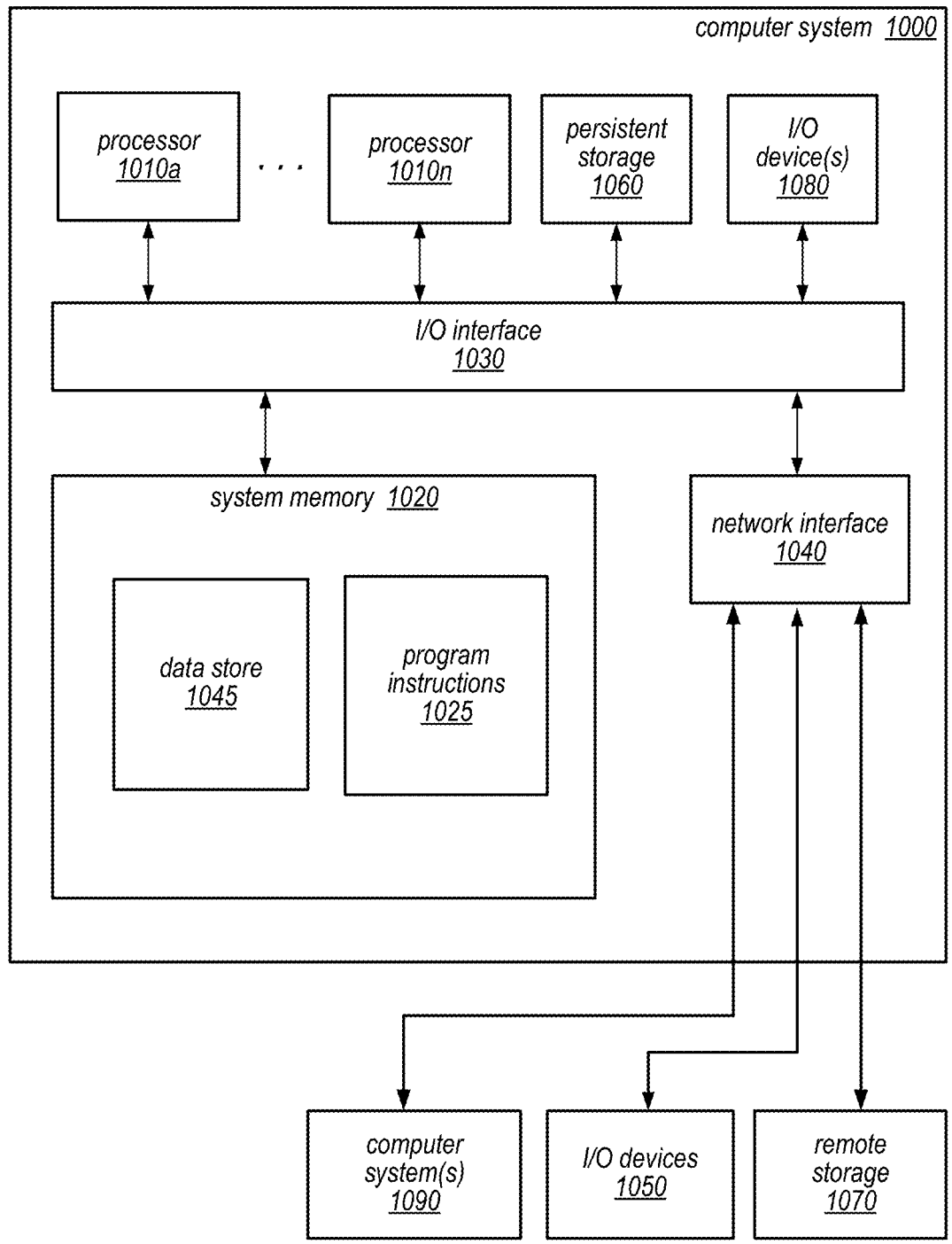
FIG. 10 is a block diagram illustrating an example computer system, according to various embodiments.

FIG. 10 is a block diagram illustrating a computer system, according to various embodiments. For example, computer system 1000 may implement a query engine or other database engine head node, or storage nodes of a storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a read-write node of a database tier, one of a plurality of read-only nodes, or one of a plurality of storage nodes of a separate distributed storage system that stores database tables and associated metadata on behalf of clients of the database tier, in various embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive a database query at an online transaction processing (OLTP) query engine;
generate, by the OLTP query engine, a plan to perform the database query;
access, by the OLTP query engine, data that describes the database to perform a first portion of the database query assigned to the OLTP query engine in the plan, the data comprising database schema information for the database or expression evaluation data for evaluating expressions supported by the OLTP query engine and an online analytical processing (OLAP) query engine, and the data accessed via an interface for the data;
access, by the OLAP query engine, the data that describes the database via the interface to perform a second portion of the database query assigned to the OLAP query engine in the plan; and
return a result for the database query based, at least in part, on the performance of the first portion of the database query by the OLTP query engine and the performance of the second portion of the database query by the OLAP query engine.

2. The system of claim 1, wherein the program instructions cause the at least one processor to further perform the method to at least:
receive another database query at the OLTP query engine; and
responsive to the other database query, perform, by the OTLP query engine, the other database query without the OLAP query engine according to a plan generated for performing the other database query.

3. The system of claim 1, wherein the program instructions cause the at least one processor to further perform the method to at least:
evaluate, by the OLAP query engine, an expression formatted for the OLTP query engine using the data describing the database accessed via the interface in order to apply the expression by the OLAP query engine.

4. The system of claim 1, wherein the OLTP and OLAP query engines are implemented together as part of a same database engine head node that provides access to the database for one or more clients of a network-based database service, and wherein the database is stored in a separate network-based storage service.

5. A method, comprising:
responsive to a database query to a database:
causing a first query engine to access data that describes the database to perform a first portion of the database query assigned to the first query engine in a plan to perform the database query, the data comprising database schema information for the database or expression evaluation data for evaluating expressions supported by the first query engine and at least a second query engine, and the data accessed via an interface for the data; and
causing the second query engine to access the data via the interface to perform a second portion of the database query assigned to the second query engine in the plan.

6. The method of claim 5, further comprising generating the plan to perform the database query based, at least in part, on a planning model that includes both the first query engine and the second query engine.

7. The method of claim 6, wherein the planning model comprises cost estimates for different operations performed by the first query engine and the second query engine.

8. The method of claim 5, further comprising:
responsive to another database query, causing the first query engine to perform the other database query without the second query engine according to a plan generated for performing the other database query.

9. The method of claim 5, wherein causing the second query engine to access the data via the interface to perform the second portion of the database query comprises obtaining a schema for one or more tables of the database.

10. The method of claim 5, further comprising:
evaluating, using the data describing the database accessed via the interface, an expression formatted for the first query engine in order to apply the expression by the second query engine.

11. The method of claim 5, wherein the first query engine is an online transaction processing (OLTP) query engine and wherein the second query engine is an online analytical processing (OLAP) query engine.

12. The method of claim 5, further comprising:
receiving the database query at the first query engine;
obtaining, by the first query engine, one or more results of the database query from the second query engine responsive to performing the second portion of the database query by the second query engine; and
returning, by the first query engine, a result for the database query including the one or more results provided by the second query engine.

13. The method of claim 5, wherein the first query engine and the second query engine are performed by a computing device that provides access to locally attached storage that stores data for the database.

14. A non-transitory, computer-readable storage medium, storing program instructions that when executed by one or more computing devices cause the one or more computing devices to implement:
receiving a database query to a database at a first query engine; and
responsive to the database query:
causing a first query engine to access data that describes the database to perform a first portion of the database query assigned to the first query engine in a plan to perform the database query, the data comprising database schema information for the database or expression evaluation data for evaluating expressions supported by the first query engine and at least a second query engine, and the data accessed via an interface for the data; and
causing the second query engine to access the data via the interface to perform a second portion of the database query assigned to the second query engine in the plan.

15. The non-transitory, computer-readable storage medium of claim 14, wherein the program instructions cause the one or more computing devices to implement evaluating, using the data describing the database accessed via the interface, an expression formatted for the first query engine in order to apply the expression by the second query engine.

16. The non-transitory, computer-readable storage medium of claim 14, further comprising generating the plan to perform the database query based, at least in part, on a planning model that includes both the first query engine and the second query engine.

17. The non-transitory, computer-readable storage medium of claim 16, wherein the planning model comprises cost estimates for different operations performed by the first query engine and the second query engine.

18. The non-transitory, computer-readable storage medium of claim 14, wherein, in causing the second query engine to access the data via the interface to perform the second portion of the database query, the program instructions cause the one or more computing devices to implement invoking, by the first query engine, one or more operations of the second query engine as part of performing the plan for the database query at the first query engine.

19. The non-transitory, computer-readable storage medium of claim 14, wherein the program instructions cause the one or more computing devices to further implement:
obtaining, by the first query engine, one or more results of the database query from the second query engine responsive to performing the second portion of the database query by the second query engine; and
returning, by the first query engine, a result for the database query including the one or more results provided by the second query engine.

20. The non-transitory, computer-readable storage medium of claim 14, wherein the first and second query engines are implemented together as part of a node implemented as part of a network-based database service that provides access to the database for one or more clients of the network-based database service.

* * * * *